United States Patent
Wu et al.

(10) Patent No.: US 7,062,035 B2
(45) Date of Patent: Jun. 13, 2006

(54) COMMUNITY DIALING CIRCUIT APPARATUS FOR POTS PHONE AND IP PHONE

(75) Inventors: Jimmy Wu, Taipei County (TW); Jack Chang, Taipei County (TW)

(73) Assignee: Leadtek Research Inc., Taipei Hsien (TW)

( * ) Notice: Subject to any disclaimer, the term of this patent is extended or adjusted under 35 U.S.C. 154(b) by 57 days.

(21) Appl. No.: 10/707,140

(22) Filed: Nov. 24, 2003

(65) Prior Publication Data

US 2004/0264680 A1  Dec. 30, 2004

(30) Foreign Application Priority Data

Jun. 24, 2003  (TW) .............................. 92117089 A

(51) Int. Cl.
  *H04M 1/00*  (2006.01)
  *H04M 3/00*  (2006.01)

(52) U.S. Cl. ........................... 379/355.01; 379/355.02; 379/368; 379/433.07

(58) Field of Classification Search ......... 379/350–386
See application file for complete search history.

(56) References Cited

U.S. PATENT DOCUMENTS

| 6,371,780 | B1 * | 4/2002 | Aponte et al. ............... 439/188 |
| 2002/0007459 | A1 * | 1/2002 | Cassista et al. ............. 713/200 |
| 2003/0021261 | A1 * | 1/2003 | Ahn et al. ................... 370/352 |
| 2003/0086559 | A1 * | 5/2003 | Chen et al. ............ 379/399.01 |
| 2004/0052242 | A1 * | 3/2004 | Laturell ...................... 370/352 |
| 2004/0176085 | A1 * | 9/2004 | Phillips et al. ............... 455/418 |

* cited by examiner

*Primary Examiner*—Sinh Tran
*Assistant Examiner*—Ramnandan Singh
(74) *Attorney, Agent, or Firm*—Jianq Chyun IP Office

(57) ABSTRACT

A community dialing circuit apparatus for IP phone and POTS phone is provided. The apparatus includes an IP phone system, a POTS phone system, an insulation system connected between the IP phone system and the POTS system, and a keypad connected to the IP phone system and the POTS system for inputting the phone number. When the city power is on and a phone number having a format of the IP phone number is inputted, the POTS phone is disabled and the IP phone is activated. When the city power is on and a phone number having a first format of the POTS phone number is inputted, the POTS phone is activated and the IP phone is disabled. When the city power is off and a phone number having a second format of the POTS phone number is inputted, the IP phone is turned off and the POTS phone is activated.

8 Claims, 2 Drawing Sheets

COMMUNITY DIALING CIRCUIT APPARATUS FOR POTS PHONE AND IP PHONE

CROSS REFERENCE TO RELATED APPLICATIONS

This application claims the priority benefit of Taiwan application serial no.92117089, filed on Jun. 24, 2003.

BACKGROUND OF INVENTION

1. Field of the Invention

The present invention relates to a dialing circuit apparatus for phone. More particularly, the present invention relates to a community dialing circuit apparatus for Plain Old Phone Service phone (POTS phone) and Internet Protocol phone (IP phone).

2. Description of the Related Art

Recently, due to the development of the Information Technologies (IT), a lot of IT product manufacturers integrate their IT product with electric appliances to make a convenient and user friendly household product. An electric appliance equipped with an IT application is commonly known as Information Appliance (IA). An IA usually means a traditional electric appliance such as a television (TV), a refrigerator, a baker, a microwave oven, or a coffee maker equipped with a software or a hardware technology to have a new application, or it may also mean an IT product designed for a household use. The IA product can further be incorporated with computer or network to have a purpose for being controlled with the computer or accessing to the network, therefore a broader function can be obtained. An IA communication media includes an Internet, a cable of a cable TV, a Digital Subscriber Line (DSL), a satellite, or a microwave.

The DSL is a continuous digital line for transferring a high bandwidth information to a user or a company by using a modem with a common copper made phone wire to connect a computer system with the digital line. An IP phone is an example of IA using DSL. The IP phone is a creative development of a network communication. A received analog voice signal is transferred into a digital signal and compressed into a packet for transporting. After the packet is received by the end user, the packet is decompressed and transferred into a voice signal, thus the voice communication is achieved. By using an IP phone, a user can save a lot of money for a long distance call. Currently, the IP phone can be classified into three types according to the communication methods, these types include: computer-to-computer, computer-to-phone, and phone-to-phone. In the previous two types, the end user needs to have a multimedia hardware, such as a multimedia personal computer (PC). The multimedia PC can be connected to Internet via an Internet Service Provider (ISP), and by using an IP phone software, a voice communication can be achieved between two end users.

Moreover, an IP phone having a video, such as a video phone can also be used to make a phone call through Internet. By using an Asymmetric Digital Subscriber Line (ADSL) technology, the videophone can be used to transport the information between the ISP and the end user. The ADSL provides different bandwidth for downstream (from the ISP to the user) and upstream (from the end user to the ISP) transmission. For example, a typical bandwidth for downstream is 1.5 mega bit per second (Mbps) to 9 Mbps, and for upstream is 16 kilo bit per second (Kbps) to 640 Kbps. Except for a higher transmission speed for video stream and voice stream can be achieved, the videophone also provides a friendly dialing panel the same as a traditional phone. Without loading a complexity to the end user, the videophone has become a major product of the IP phone.

As mentioned above, since the Internet phone has a lot of advantages, however, the ISP and the IP phone depend heavily on the city power supply. When the city power fails, the power of the ISP and the IP phone is off and can not be used. As a contrast, the POTS phone is communicated by a wire between the phones and does not depend on the city power. Therefore, when the city power fails, the POTS phone can also be used very well, and this is an excellent feature that an IP phone does not have.

Accordingly, a POTS phone and an IP phone are still not yet integrated into a single device, so that the end user can not use a device to connect to the POTS network and the IP network simultaneously. Therefore, it is important to have a community dialing circuit apparatus for POTS phone and IP phone.

SUMMARY OF INVENTION

Accordingly, the purpose of the present invention is to provide a community dialing circuit apparatus incorporating the Plain Old Phone Service phone (POTS phone) and the Internet Protocol phone (IP phone) POTS phone. Therefore, no matter what the city power supply on or off, the community dialing circuit apparatus of the invention can provide a POTS phone to a user.

As embodied and broadly described herein, the present invention provides a community dialing circuit apparatus. The community dialing circuit apparatus includes, for example but not limited to, an IP phone system, a POTS phone system, an insulation system connected between the IP phone system and the POTS system, and a keypad connected to the IP phone system and the POTS system for inputting the phone number. The IP phone system activates an IP phone according to an IP phone number, and the POTS phone system activates a POTS phone according to a POTS phone number. The insulation system is used for insulating the IP phone system from the POTS system. First, when a city power is on and a first phone number having a format of the IP phone number is inputted from the key panel, the first phone number is used as the IP phone number. The IP phone system outputs a first dialing data signal to the insulation system, the insulation system receives the first dialing data signal and outputs a second dialing data signal to the POTS phone system to disable the POTS phone, and the IP phone is activated. Secondly, when the city power is on and a second phone number having a first format of the POTS phone number is inputted from the key panel. The second phone number is transferred by the insulating system and used as the POTS phone number to active the POTS phone, and the IP phone is disabled. Thirdly, when the city power is off and a third phone number having a second format of the POTS phone number is inputted from the key panel. The IP phone is turned off without a power supply from the city power, and the third phone number is used to active the POTS phone.

In a preferred embodiment of the invention, the key panel further includes an IP phone keypad connected to the IP phone system, and a POTS phone keypad connected to the POTS phone system. The key panel is disposed above the IP phone keypad and the POTS phone keypad, in which each key of the key panel is disposed above a key of the IP phone keypad and above a key of the POTS phone keypad. Thus when a phone number is inputted, the IP phone keypad and the POTS phone keypad receive the phone number respectively and simultaneously.

In an embodiment of the invention, the first format of the POTS phone number is the same as the second format of the POTS phone number. In another embodiment of the invention, the first format of the POTS phone number is different from the second format of the POTS phone number.

In an embodiment of the invention, the POTS phone system further includes: a plurality of first input terminals and a plurality of second input terminals connected to each key of the POTS phone keypad respectively; a switch device connected to the first input terminals of the POTS phone keypad, wherein the switch device has a plurality of third terminals corresponding to the first input terminals; a POTS phone dialing unit connected to the POTS phone system, the third terminals and the second input terminals; and a POTS phone control unit connected to the switch device, the third terminals, the second input terminals and the insulation system. Therefore, when the city power is on and the second phone number having the first format of the POTS phone number is inputted from the key panel, a connection between the first input terminal of the POTS phone keypad and the POTS phone dialing unit is turned off by the switching device. The second phone number is transferred by the insulating system and used as the POTS phone number to active the POTS phone, and the IP phone is disabled. Alternatively, when the city power is off and a third phone number having a second format of the POTS phone number is inputted from the key panel, the IP phone is turned off without a power supply from the city power. The connection between the first input terminal of the POTS phone keypad and the POTS phone dialing unit is turned on by the switching device. The third phone number is received by the POTS phone dialing unit via the second input terminals and the third terminals to active the POTS phone.

In an embodiment of the invention, the IP phone system further includes a logic converting unit connected to the IP phone keypad for converting the phone number to an IP dialing data signal; a main control unit connected to the logic converting unit and the insulation system for receiving the IP dialing data signal and outputting the first dialing data signal to the insulation system and outputting an IP phone transmission signal; an IP phone control unit connected to the main control unit for receiving the IP phone transmission signal and outputting an IP phone control signal; and a RJ-45 port connected to a phone company and to the IP phone control unit via an IP phone interface for activating an IP phone by the IP phone control signal.

In an embodiment of the invention, the POTS phone system includes: a POTS phone interface connected to the POTS phone dialing unit for outputting a POTS phone interface signal according to the POTS phone number; and a RJ-11 port connected to a phone company and to the POTS phone interface for activating a POTS phone by the POTS phone interface signal.

Accordingly, in the embodiments of the invention, it is understood that: 1. The IP phone is activated and a phone link through the IP network system is activated when the IP phone is used and the city power on. 2. When the POTS phone is selected and the city power on, a first dialing data signal is provided by the IP phone system to POTS phone control unit via the insulation system. Thus, the POTS phone control unit is used to active the POTS phone. 3. When the city power is off, the POTS phone control unit turns on the switch device to electrically connect the POTS phone dialing unit with the POTS phone keypad, and to receive a phone number inputted from an user to active the POTS phone.

Accordingly, in the embodiment of the present invention, no matter what the city power is on or off, the community dialing circuit apparatus can activate an IP phone network or a POTS phone network by using only one dialing circuit apparatus.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. The drawings are as follows.

DETAILED DESCRIPTION

The following issues are considered in an embodiment of the design of the community dialing circuit apparatus for POTS phone and IP phone of the present invention. 1. Since the POTS phone is directly connected to a circuit device of a phone company via a RJ-11 port, a device security issue base on the specification of the phone company must be taken into consideration. Thus, a proper insulation device must be designed to successfully protect the community dialing circuit apparatus from an unanticipated electric shock. 2. The community dialing circuit apparatus must not depend on a power supply such as a city power so that the POTS phone call can always be achieved through the community dialing circuit apparatus.

According to the two issues discussed above, the embodiment of the present invention provides a community dialing circuit apparatus that integrates an IP phone and a POTS phone into one, and provides a combination keypad to a user. This community dialing circuit apparatus can access an IP phone network or a POTS phone network by the combination keypad, and regardless of a city power on or off to the community dialing circuit apparatus, a POTS phone service functions as usual. A description of the embodiment of the present invention is described in the following.

Figure 1:
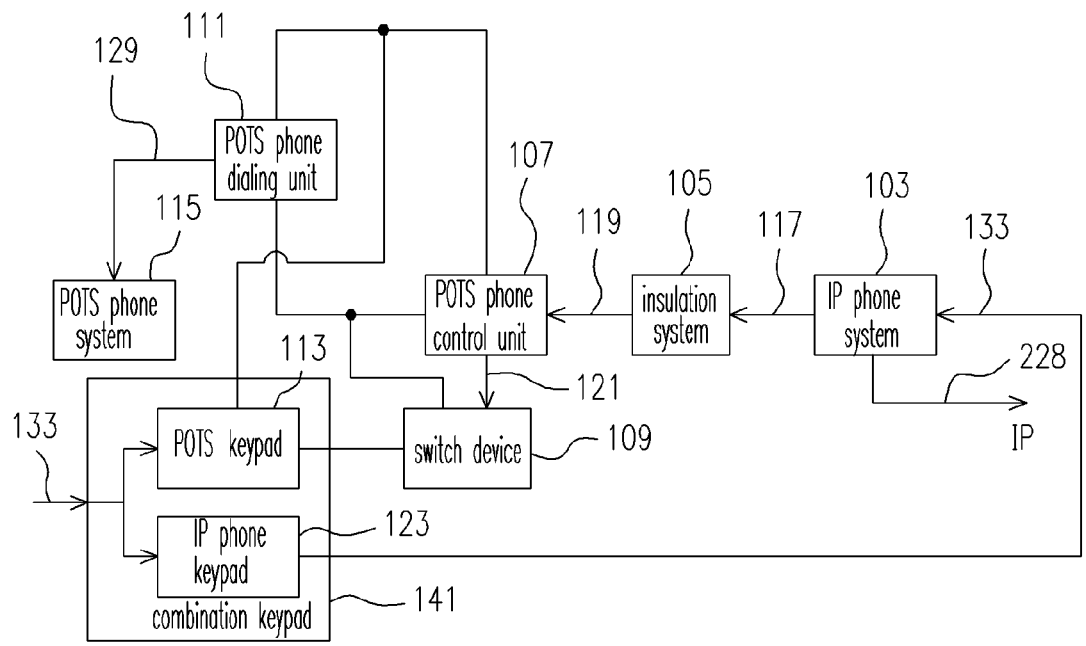
FIG. 1 is a block diagram of a circuit illustrating community dialing circuit apparatus according to a preferred embodiment of the present invention.

First, referring to FIG. 1, a block diagram of the circuit of the community dialing circuit apparatus of the preferred embodiment of the present invention is illustrated. The community dialing circuit apparatus includes, for example but not limited to, an IP phone system 103, an insulation system 105, a POTS phone system 115, a POTS dialing unit 111, a POTS phone control unit 107, a switch device 109, and a combination keypad 141 having a POTS keypad 113 and an IP phone keypad 123. In an embodiment of the invention, the POTS keypad 113 has a key panel and the IP phone keypad 123 has another key panel. When the user is decided to use the POTS phone, the key panel of the POTS is used, and when the user is decided to use the IP phone, the key panel of the IP phone is used.

In a preferred embodiment of the invention, both the POTS keypad 113 and the IP phone keypad 123 use the same key panel of the combination keypad 141. In other words, when any one of the key of the key panel of the combination keypad 141 is pressed, the same key of the POTS keypad 113 and the same key of the IP phone keypad 123 are also be pressed. The circuit shown in FIG. 1 is able to decide whether to access the user input phone number 133 input from the POTS keypad 113 or the user input phone number 133 input from the IP phone keypad 123 according to the supply status of the city power. Substantially, the format of the input phone number 133 used for the POTS phone system 115 is defined to be differentiable from the format of the input phone number 133 used for the IP phone system 103. Hereinafter, the functions of the circuit shown in FIG. 1 will be described in detail. 1. When a city power is provided, and the IP phone system is used, the IP phone system 103 will active the IP phone according to the user input phone number 133 input from the IP phone keypad 123 of the combination keypad 141. 2. When a city power is provided, and the POTS phone system is used, the IP phone system 103 will output a first dialing data signal 117 to the insulation system 105. In a preferred embodiment of the present invention, the insulation system 105 includes, for example but not limited to, a photo-coupling system that contains four photo-coupled transistors (PCT). The insulation system 105 is electrically connected to the IP phone system 103. After the first dialing data signal 117 is coupled, the insulation system transforms the second dialing data signal 119 to the POST phone control unit 107. The POTS phone control unit 107 is electrically connected to the POTS keypad 113 of the combination keypad 141, the POTS dialing unit 111, the insulation system 105, and the switch device 109. The POTS phone control unit 107 disables a city power off control signal 121. In a preferred embodiment of the present invention, for example but not limited to, a low voltage level represents "disable", and a high voltage level represents "enable". When the city power off control signal 121 is at the low voltage level, the switch device 109 will be turned off. Then, the POTS phone control unit 107 actives the POST phone dialing unit 111 to output the POTS phone dialing data signal 129 to the POTS phone system 115 according to a second dialing data signal 119 received from the insulation system 105. Thereafter, a POTS phone call is activated. 3. When the city power supply is off, the second dialing data signal 119 outputted from the insulation system 105 will be at a high voltage level. The POTS phone control unit 107 will enable the city power off control signal 121 and the authority of control is transferred to the POTS phone dialing unit 111. By enabling the city power off control signal 121, the user input phone number 133 input from the POTS keypad 113 is used to control the POTS phone dialing unit 111 to output a POTS phone dialing data signal 129 to the POTS phone system 115. Thereafter, the POTS phone is activated.

Figure 2:
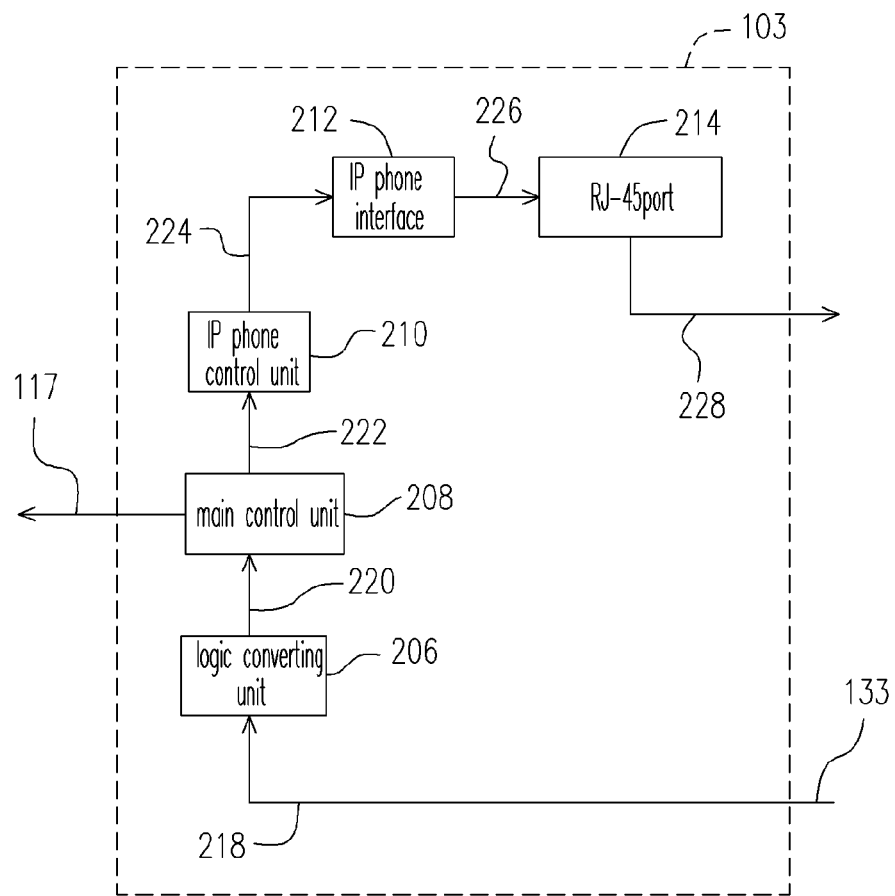
FIG. 2 is block diagram of a circuit illustrating an IP phone system according to a preferred embodiment of the present invention.

Next, referring to FIG. 2, a block diagram of a circuit device of an IP phone system of the preferred embodiment of the present invention is illustrated. The IP phone system 103 includes, for example but not limited to, a logic converting unit 206, a main control unit 208, an IP phone control unit 210, an IP phone interface 212, and a RJ-45 port 214. The IP phone system 103 can operate normally when the city power supply is on, and the operation thereof is described in the following. First, the IP phone keypad 123 receives a user input phone number 133, and outputs a first IP network dialing data signal 218 to the logic converting unit 206. The logic converting unit 206 is electrically connected to the main control unit 208, and outputs a second IP network dialing data signal 220 according to the first IP network dialing data signal 218. In a preferred embodiment of the invention, the second IP network dialing data signal 220 can be a mapping of the first IP network dialing data signal 218 according to the position of the key of the IP phone keypad 123 related to the whole IP phone keypad 123. For example, the mapping is decided by the row and the column of the position of the key of the IP phone keypad 123. Finally, an IP network phone number is output by the mapping and sent out via the IP network.

Then, the logic converting unit 206 is electrically connected, for example but not limited to, the light coupling system of the insulation system 105 via the main control unit 208. Accordingly, the main control unit 208 outputs an IP network phone transmission signal 222 according to the second IP network dialing data signal 220 when the IP phone is used, and outputs the first dialing data signal 117 when the POTS phone is used. In an embodiment of the invention, when the IP network phone is used, the main control unit 208 can output a data or a code indicating "without POTS keypad" to the insulation system 105. Therefore, the POTS phone control unit 107 will not output any signal to the POTS phone dialing unit 111. The IP phone control unit 210 is electrically connected to the main control unit 208. The IP phone control unit 210 outputs an IP network phone control signal 224 to the IP network phone interface 212 according to the IP network phone transmission signal 222. The IP network phone interface 212 is electrically connected to the IP phone control unit 210, and is used for outputting an IP phone interface signal 226 according to the IP phone control signal 224. The RJ-45 port 214 electrically connected to the IP phone interface 212 outputs an IP phone connecting signal 228 according to the IP phone interface signal 226 to active an IP phone connection. Therefore, the IP phone is activated.

Figure 3:
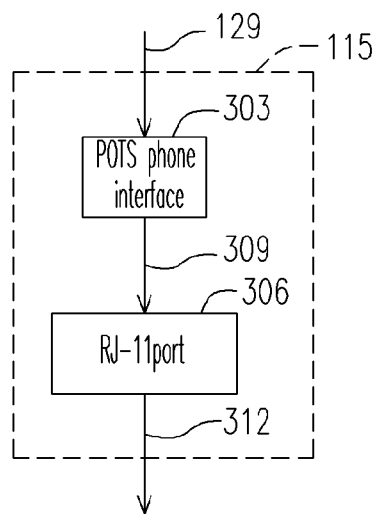
FIG. 3 is a block diagram of a circuit illustrating a POTS phone system according to a preferred embodiment of the present invention.

Referring to FIG. 3, a block diagram of a circuit device of a POTS phone system is illustrated according to a preferred embodiment of the present invention. The circuit device block diagram of the POTS phone system 115 includes, for example but not limited to, a POTS phone interface 303, and a RJ-11 port 306. The POTS phone interface 303 electrically connected to the POTS dialing unit 111 outputs a POTS phone interface signal 309 according to a POTS phone dialing data signal 129. The RJ-11 port 306 electrically connected to the POTS phone interface 303 outputs a POTS connecting signal 312 to a POTS network of a phone company according to the POTS phone interface signal 309. Therefore, a POTS phone call is activated.

Figure 4:
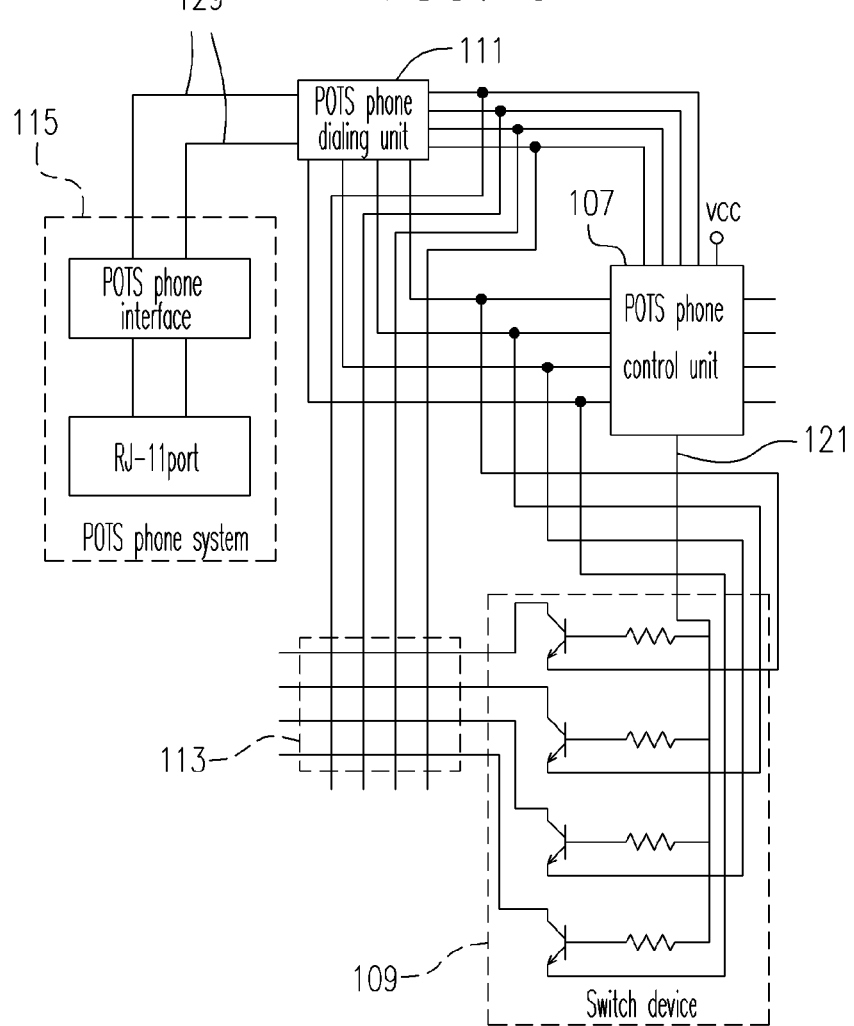
FIG. 4 is a block diagram of a circuit illustrating a terminal of a power supply end of a POTS phone company.

Next, FIG. 4 is a block diagram of a circuit device illustrating a POTS phone of a phone company power supply terminal according to a preferred embodiment of the present invention. Referring to FIG. 4, the detail circuit connection among the POTS phone system 115, the POTS phone dialing unit 111, the POTS keypad 113, POTS phone control unit 107, and the switch device 109 is illustrated. In the preferred embodiment of the present invention, the switch device 109 is constructed by, for example but not limited to, four transistors. The POTS keypad 113 includes, for example but not limited to, an array of wires that connecting four lines from the four transistors and four lines from the POTS phone dialing unit 111, wherein each of the connection point is used as a key of the POTS keypad 113.

Hereinafter, the dialing process of the community dialing circuit apparatus of the preferred embodiment of the present invention will be described. The dialing method controlled by the main control unit 208 can be classified into two ways: one is an IP phone dialing method, and the other is a POTS phone dialing method. Both of the two methods will be described in the following. 1. The IP phone dialing method: the main control unit 208 connects to an IP network via IP phone control unit 210, IP phone interface 212, and RJ-45 port 214, to send an IP packet to a remote IP address to establish an IP phone link. The IP phone method can not be used when the city power is off. 2. The POTS phone dialing method: the dialing method can be classified into two modes, one is a city-power-on mode and the other is a city-power-off mode. (1) In the city-power-on mode, before a user inputs a destination phone number, the input of a pre-defined code is required, in order to transform the IP phone mode into the POTS phone mode. In a preferred embodiment of the present invention, for example, but not limited to, a pre-defined code "0000" is used to transform the IP phone mode to the POTS phone mode. When the user inputs "0000" as a pre-defined code, the first dialing data signal 117 is defined as "0000". Via the insulation system 105 such as a photo-coupling system, the main control unit 208 outputs the first dialing data signal 117 to the POTS phone control unit 107. When the POTS phone control unit 107 receives a second dialing data signal 119 from the insulation system 105, the second dialing data signal 119 is also defined as "0000" as well. When the second dialing data signal 119 "0000" is received, the city power off control signal 121 is disabled, and therefore the POTS keypad 113 is also disabled. Thereafter, the POTS phone dialing unit 111 sends out a POTS phone dialing data signal 129 through the POTS phone interface 303 and the RJ-11 port 306, and connects to a remote phone via a POTS network. (2) In the city-power-off mode, the POTS phone dialing unit 111 receives a second dialing data signal 119 having a high voltage level from the insulation system 105 and the POTS phone control unit 107. This high voltage level signal indicates that the city power is off, and therefore the authority of control is transferred into the POTS phone dialing unit 111. At the same time, the POTS phone control unit 107 enables the city power off control signal 121 to turn on the switch device 109; thus the POTS keypad 113 is connected to the POTS phone dialing unit 111. The POTS phone dialing unit 111 outputs the POTS phone dialing data signal 129 according to the user input phone number 133 from the POTS keypad 113. The POTS phone dialing data signal 129 is transformed via the POTS phone interface 303 and the RJ-11 port 306 to a remote POTS phone of a phone company. The activation of the POTS phone of the invention is the same as that of a traditional POTS phone.

The insulation system 105 of the preferred embodiment of the present invention includes, for example, a photo-coupling system. However, the insulation system 105 is not limited to a photo-coupling system. Any device that can separate an IP phone system from a POTS phone system can be use as an insulation system in the embodiment of the present invention. Moreover, the photo-coupling system in the embodiment of the present invention is constructed by, for example, four phototransistors. However, the number of the phototransistors may not be limited to four, but can be selected according to the need of the design.

It will be apparent to those skilled in the art that various modifications and variations can be made to the structure or to the methods of the preferred embodiment of the present invention without departing from the scope or spirit of the invention. In view of the foregoing, it is intended that the present invention cover modifications and variations of this invention provided they fall within the scope of the following claims and their equivalents.

The invention claimed is:

1. A community dialing circuit apparatus incorporating an Internet Protocol (IP) phone and a Plain Old Phone Service (POTS) phone, comprising:
    an IP phone system for activating an IP phone according to an IP phone number;
    a POTS phone system for activating a POTS phone according to a POTS phone number;
    an insulation system electrically connected between the IP phone system and the POTS phone system for insulating the IP phone system from the POTS system; and
    a key panel connected to the IP phone system and the POTS phone system;
    wherein when a city power is on and a first phone number having a format of the IP phone number is inputted from the key panel, the first phone number is used as the IP phone number, the IP phone system outputs a first dialing data signal to the insulation system, the insulation system receives the first dialing data signal and outputs a second dialing data signal to the POTS phone system to disable the POTS phone, and the IP phone is activated;
    wherein when the city power is on and a second phone number having a first format of the POTS phone number is inputted from the key panel, the second phone number is transferred by the insulating system and used as the POTS phone number to active the POTS phone, and the IP phone is disabled;
    wherein when the city power is off and a third phone number having a second format of the POTS phone number is inputted from the key panel, the IP phone is turned off without a power supply from the city power, and the third phone number is used to active the POTS phone, wherein the key panel further comprises:
    an IP phone keypad connected to the IP phone system; and
    a POTS phone keypad connected to the POTS phone system; wherein
    the key panel is disposed above the IP phone keypad and the POTS phone keypad, wherein each key of the key panel is disposed above a key of the IP phone keypad and above a key of the POTS phone keypad, whereby when a phone number is inputted, the IP phone keypad and the POTS phone keypad receive the phone number respectively.

2. The community dialing circuit apparatus of claim 1, wherein the POTS phone system further comprises:
    a plurality of first input terminals and a plurality of second input terminals connected to each key of the POTS phone keypad respectively;
    a switch device connected to the first input terminals of the POTS phone keypad, wherein the switch device has a plurality of third terminals corresponding to the first input terminals;
    a POTS phone dialing unit connected to the POTS phone system, the third terminals and the second input terminals; and
    a POTS phone control unit connected to the switch device, the third terminals, the second input terminals and the insulation system;
    wherein when the city power is on and the second phone number having the first format of the POTS phone number is inputted from the key panel, a connection between the first input terminal of the POTS phone keypad and the POTS phone dialing unit is turned off by the switching device, the second phone number is transferred by the insulating system and used as the POTS phone number to active the POTS phone, and the IP phone is disabled;

wherein when the city power is off and a third phone number having a second format of the POTS phone number is inputted from the key panel, the IP phone is turned off without a power supply from the city power, the connection between the first input terminal of the POTS phone keypad and the POTS phone dialing unit is turned on by the switching device, the third phone number is received by the POTS phone dialing unit via the second input terminals and the third terminals to active the POTS phone.

3. The community dialing circuit apparatus of claim 2, wherein the switch device comprises a plurality of transistors.

4. The community dialing circuit apparatus of claim 1, wherein the first format of the POTS phone number is the same as the second format of the POTS phone number.

5. The community dialing circuit apparatus of claim 1, wherein the first format of the POTS phone number is different from the second format of the POTS phone number.

6. The community dialing circuit apparatus of claim 1, wherein the IP phone system further comprises:

a logic converting unit connected to the IP phone keypad for converting the phone number to an IP dialing data signal;

a main control unit connected to the logic converting unit and the insulation system for receiving the IP dialing data signal and outputting the first dialing data signal to the insulation system and outputting an IP phone transmission signal;

an IP phone control unit connected to the main control unit for receiving the IP phone transmission signal and outputting an IP phone control signal; and a RJ-45 port connected to a phone company and to the IP phone control unit via an IP phone interface for activating an IP phone by the IP phone control signal.

7. The community dialing circuit apparatus of claim 1, wherein the POTS phone system comprises:

a POTS phone interface connected to the POTS phone dialing unit for outputting a POTS phone interface signal according to the POTS phone number; and a RJ-11 port connected to a phone company and to the POTS phone interface for activating a POTS phone by the POTS phone interface signal.

8. The community dialing circuit apparatus of claim 1, wherein the insulation system can be a photo-coupling system.

* * * * *